(12) United States Patent
Hong et al.

(10) Patent No.: US 7,476,376 B2
(45) Date of Patent: Jan. 13, 2009

(54) METAL COMPOSITE OXIDE WITH NOVEL CRYSTAL STRUCTURE AND THEIR USE AS IONIC CONDUCTORS

(75) Inventors: Seung Tae Hong, Daejeon (KR); Yun Ho Roh, Seoul (KR); Eung Je Lee, Seoul (KR); Mi Hyae Park, Seoul (KR)

(73) Assignee: LG Chem, Ltd., Seoul (KR)

( * ) Notice: Subject to any disclaimer, the term of this patent is extended or adjusted under 35 U.S.C. 154(b) by 680 days.

(21) Appl. No.: 11/110,940

(22) Filed: Apr. 21, 2005

(65) Prior Publication Data
US 2006/0051278 A1    Mar. 9, 2006

(30) Foreign Application Priority Data
Apr. 21, 2004  (KR) ............... 10-2004-0027544

(51) Int. Cl.
| | |
|---|---|
| C01F 5/02 | (2006.01) |
| C01F 17/00 | (2006.01) |
| C01G 3/02 | (2006.01) |
| C01G 41/02 | (2006.01) |
| C01D 1/02 | (2006.01) |
| G01N 27/26 | (2006.01) |
| H01B 1/08 | (2006.01) |
| H01M 8/10 | (2006.01) |

(52) U.S. Cl. ............... 423/593.1; 423/263; 423/306; 423/307; 423/463; 423/464; 423/467; 423/518; 423/635; 423/594.1; 423/594.2; 423/594.7; 423/594.8; 423/594.15; 423/594.16; 423/606; 423/641; 205/783.5; 252/518.1; 252/519.1; 252/519.12; 252/519.15; 252/520.2; 252/520.5; 252/521.1; 429/33

(58) Field of Classification Search .............. 423/263, 423/306, 307, 463, 464, 467, 518, 593.1, 423/594.1, 594.2, 594.7, 594.8, 594.15, 594.16, 423/606, 641; 205/783.5; 252/518.1, 519.1, 252/519.12, 519.15, 520.2, 520.5, 521.1; 429/33
See application file for complete search history.

(56) References Cited
U.S. PATENT DOCUMENTS
4,920,093 A * 4/1990 Nonaka et al. ............. 505/446
(Continued)

FOREIGN PATENT DOCUMENTS
WO    WO 97/37933    10/1997
(Continued)

OTHER PUBLICATIONS
M. A. L. Field, C. S. Knee and M. T. Weller, "Structure Determination of the Layered Manganocuprates Ln3Ba2Mn2Cu2O12±y, Ln=Sm, Eu, by Powder Neutron Diffraction" Journal of Solid State Chemistry, vol. 167, Issue 1, Aug. 2002, pp. 237-244.*
(Continued)

Primary Examiner—Ngoc-Yen M Nguyen
Assistant Examiner—Diana J Liao
(74) Attorney, Agent, or Firm—McKenna Long & Aldridge LLP

(57) ABSTRACT

Disclosed is metal composite oxides having the new crystal structure. Also disclosed are ionic conductors including the metal composite oxides and electrochemical devices comprising the ionic conductors. The metal composite oxides have an ion channel formed for easy movement of ions due to crystallographic specificity resulting from the ordering of metal ion sites and metal ion defects within the unit cell. Therefore, the metal composite oxides according to the present invention are useful in an electrochemical device requiring an ionic conductor or ionic conductivity.

20 Claims, 8 Drawing Sheets

U.S. PATENT DOCUMENTS

| | | | | |
|---|---|---|---|---|
| 5,824,278 | A | * | 10/1998 | Yao .......................... 423/263 |
| 5,911,860 | A | | 6/1999 | Chen et al. |
| 5,972,845 | A | * | 10/1999 | Tauber et al. ............... 505/125 |
| 6,042,806 | A | * | 3/2000 | Bedard ................... 423/594.3 |
| 6,146,445 | A | | 11/2000 | Chen et al. |
| 6,384,534 | B1 | * | 5/2002 | Srivastava et al. ........... 313/633 |

FOREIGN PATENT DOCUMENTS

| | | |
|---|---|---|
| WO | WO 03/034445 | 4/2003 |

OTHER PUBLICATIONS

S. Kemmler-Sack, "Über hexagoanale Perowskite mit Kationenfehlstellen. IV. Ba8Re3MvW3O24 mit Mv = Nb, Ta—Perowskitstapelvarianten vom 24 L-Typ", Zeitschrift für anorganische und allgemeine Chemie, vol. 446 Issue 1, pp. 181-184 (with English translation).*

V.V. Kharton, F.M.B. Marques, A. Atkinson, "Transport properties of solid oxide electrolyte ceramics: a brief review" Journal—Solid State Ionics, (2004) vol. 174; pp. 135-149.

P. Lacorre, F. Goutenoire, O. Bohnke, R. Retoux, Y. Laligant, "Designing fast oxide-ion conductors based on $La_2Mo_2O_9$" Letters to Nature (2000) vol. 404, pp. 856-858.

X. Turrillas, A.P. Sellars, B.C.H. Steele, "Oxygen Ion Conductivity in Selected Ceramic Oxide Materials" Journal—Solid State Ionics (1988) col. 28-30, pp. 465-469.

"International Tables for Crystallography", vol. A, $5^{th}$ ed., Publisher: Kluwer Academic (2002), p. 701.

T. Norby, "Solid-state protonic conductors: principles, properties, progress and prospects" Journal—Solid State Ionics (1999) vol. 125, pp. 1-11.

I. Animitsa, T. Norby, S. Marion, R. Glockner, A. Neiman, "Incorporation of water in strontium tantalates with perovskite-related structure" Journal—Solid State Ionics (2001) vol. 145, pp. 357-364.

* cited by examiner

METAL COMPOSITE OXIDE WITH NOVEL CRYSTAL STRUCTURE AND THEIR USE AS IONIC CONDUCTORS

CROSS-REFERENCE TO RELATED APPLICATIONS

This application claims the benefit of Korean Patent Application No. 10-2004-27544 filed Apr. 21, 2004 in Korea, which is hereby incorporated by reference in its entirety.

TECHNICAL FIELD

The present invention relates to metal composite oxides with a novel crystal structure which exhibits an ionic conductivity, and more particularly to a barium-tungsten oxide with an ion channel formed for easy movement of ions due to crystallographic specificity resulting from the ordering of metal ion sites and metal ion defects within a unit cell, and/or derivatives thereof, ionic conductors including the oxides and an electrochemical devices comprising the ionic conductors.

BACKGROUND ART

Active studies have been made to ionic conductors which are solid materials used as electrolytes in electrochemical devices, such as gas sensors and fuel cells. Major solid ionic conductors which have been known to date can be classified according to their crystal structures as shown in Table 1 [V. V. Kharton, F. M. B. Marques, A, Atkinson, Solid State Ionics, 174 (2004) 135-149. P. Lacorre, F. Goutenoire, O. Bohnke, R. Retoux, Y. Laligant, Nature, 404 (2000) 856-858. X. Turrillas, A. P. Sellars, B. C. H. Steele, Solid State Ionics, 28-30 (1988) 465-469].

SOFC. In a high-temperature SOFC using any other electrolyte (doped ceria or $La_{0.8}Sr_{0.2}GaO_{3-\delta}$) than YSZ, materials such as $La_{0.9}Sr_{0.1}AlO_{3-\delta}$ or $Gd_2Zr_2O_7$ can be used as a protective layer of a cathode. An ionic conductor membrane for use in an oxygen pump should have both electrical conductivity and ionic conductivity. Accordingly, doped ceria, rather than YSZ with very low electrical conductivity, is suitable to be used in an oxygen pump. In addition, compounds having a cryolite structure or $LaYO_3$-type high-temperature oxygen ionic conductors function as proton conductors at a wet atmosphere and a low temperature.

Since various properties are required according to the applications, it is very important to develop new-type materials having ionic conductivity. If a new material with a new crystal structure is developed, thousands of derivatives can be synthesized and prepared from the new material, which results in the rapid development of relevant technologies.

BRIEF DESCRIPTION OF THE DRAWINGS

The foregoing and other objects, features and advantages of the present invention will become more apparent from the following detailed description when taken in conjunction with the accompanying drawings in which.

TABLE 1

| | Examples | |
|---|---|---|
| Structural type | compound | Crystal system & unit cell dimensions (Å) |
| Fluorite | doped Zirconia: $Y_xZr_{1-x}O_{2-\delta}$(YSZ) | F-cubic: a ≈ 5.2 |
| | doped Ceria: $Ce_{0.9}Sm_{0.1}O_{2-\delta}$ $Ce_{0.3}Gd_{0.2}O_{2-\delta}$(CGO) | F-cubic: a ≈ 5.4 |
| | $\delta$-$Bi_2O_3$-based phases: $Bi_{1.6}Er_{0.4}O_3$ | F-cubic: a ≈ 5.5 |
| Perovskite | $LaGaO_3$-based phases: $La_{0.5}Sr_{0.2}Ga_{0.75}Mg_{0.2}O_{3-\delta}$ (LSGM) | P-cubic: a ≈ 3.9 |
| | $LnBO_3$-based phases: $La_{0.9}Sr_{0.1}AlO_{3-\delta}$ | P-cubic: a ≈ 3.8 |
| | (Brownmillerite-type) $Ba_2In_2O_5$-based phases: $BaIn_0$-$Zr_{0.3}O_{3-\delta}$(disordered perovskite) | P-cubic: a ≈ 4.2 |
| | (Cryolite) $A_3BO_{6-\delta}$:$Sr_6Ta_2O_{11}{}^c$ | F-cubic: a ≈ 8.3 |
| Aurivillius series: $Bi_2A_{n-1}B_nO_{3n+\delta}(n=1)$ | $\gamma$-$Bi_2VO_{5.5}$-based phases (BIME VOX): $Bi_2V_{0.9}Cu_{0.1}O_{5.5-6}$ | I-tetragonal: a ≈ 3.9, c ≈ 15.5 |
| Pyrochlore | $A_2B_2O_7$:$Gd_2Zr_2O_7$ | F-cubic: a ≈ 5.3 |
| Apatite | $A_{10-x}(MO_4)_6O_{2-5}$:$La_{9.33}Si_6O_{26}$ | P-trigonal: a ≈ 9.7, c ≈ 7.2 |
| $\beta$-$SnWO_4$ | $La_2Mo_2O_9$-based phases: $La_2Mo_2O_9{}^b$ | P-cubic: a ≈ 7.2 |

All the materials listed in Table 1 have potentials. However, each may be advantageous or disadvantageous in certain applications because the above materials exhibit different ionic conductivities and physicochemical properties at various temperatures due to their structural characteristics such as crystal structures and ionic defect structures.

For example, in solid oxide fuel cell ("SOFC") applications, it has been known that yttrium stabilized zirconia ("YSZ") is the most suitable material for use as a high-temperature SOFC electrolyte. However, a doped ceria-type is more suitable for a low-temperature (lower than 600° C.)

Figure 5:
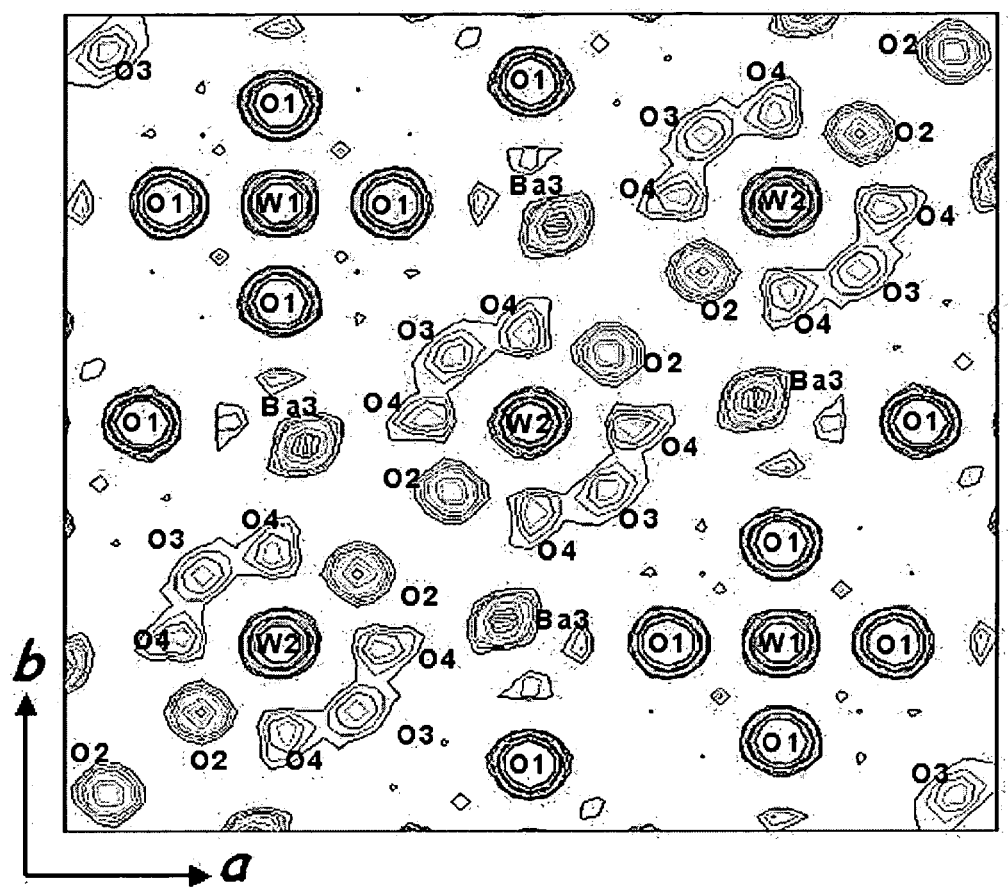
Figure 6:
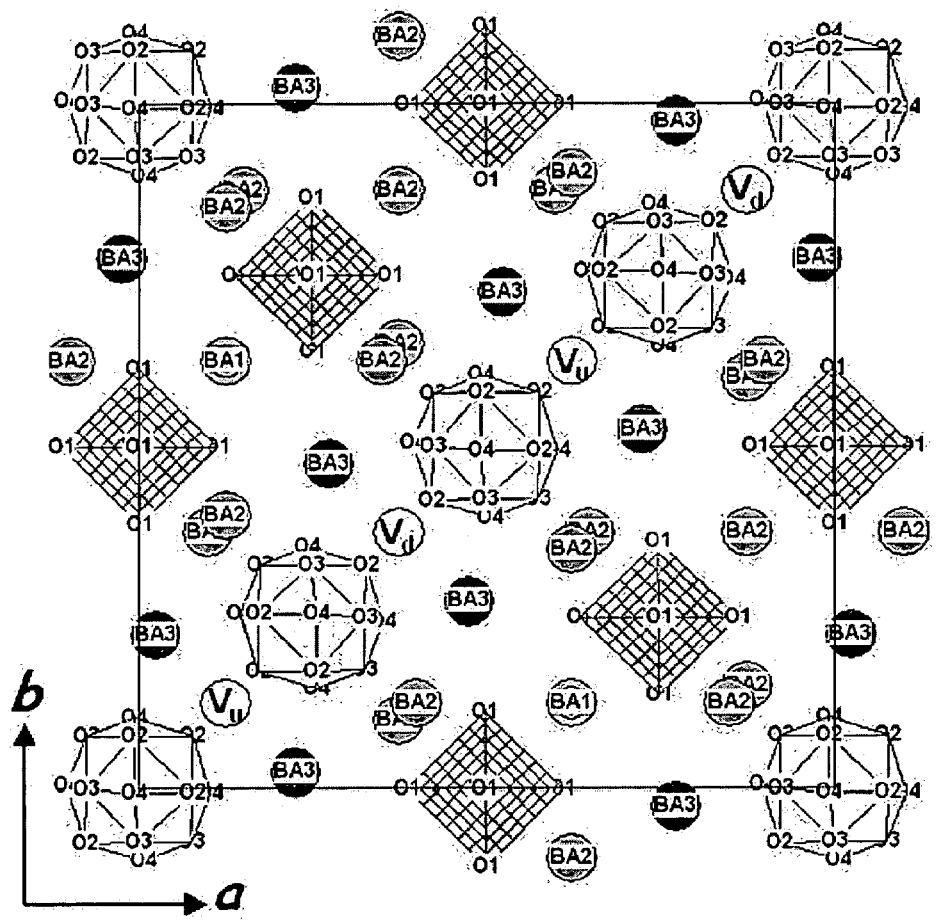
Figure 7:
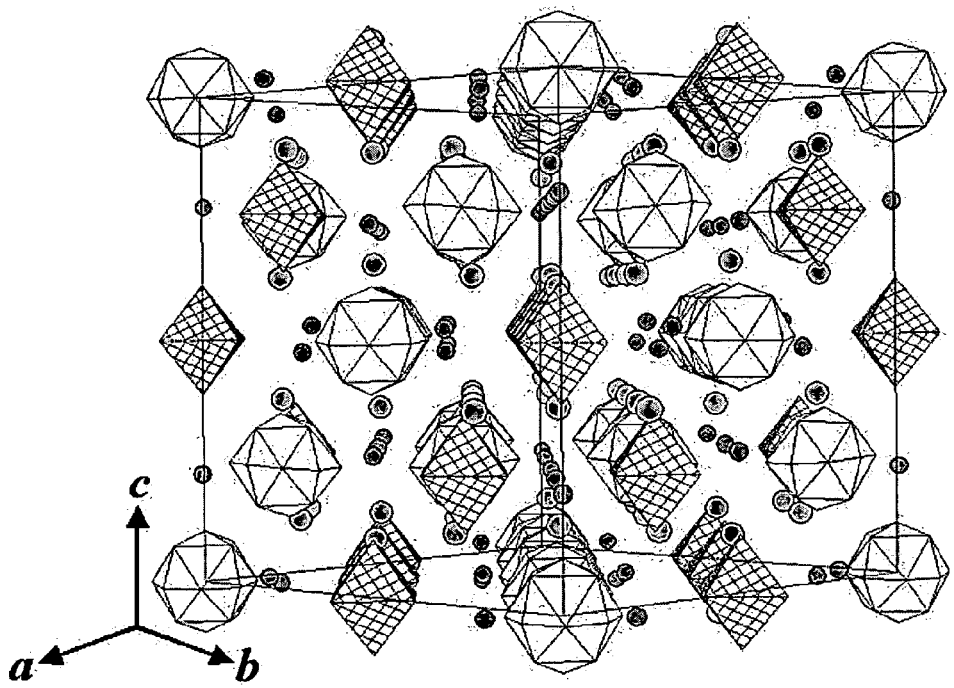
Figure 8:
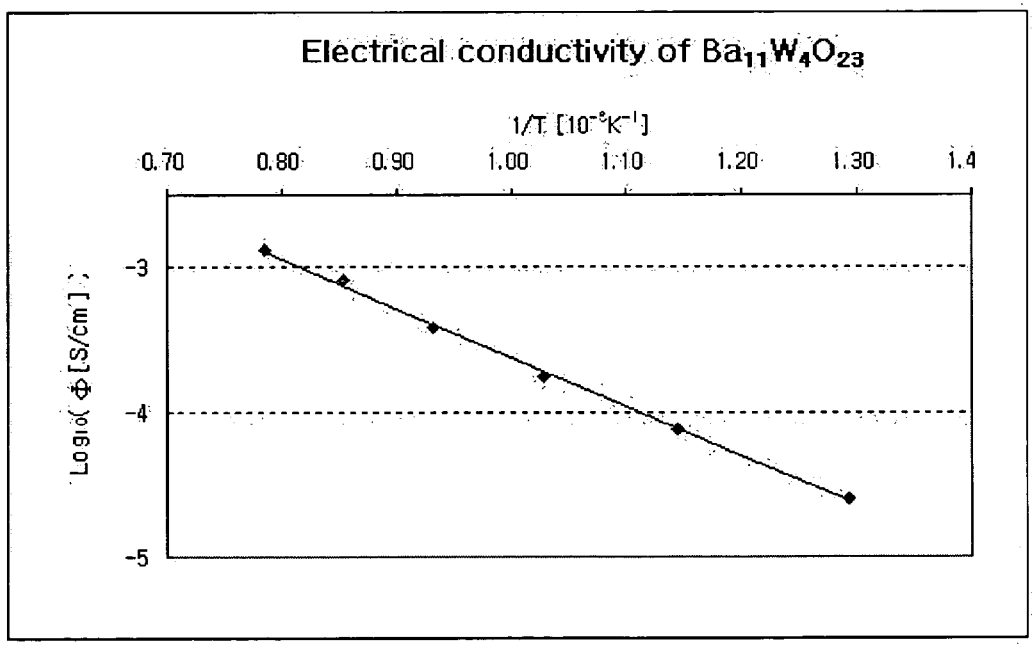
Figure 9:
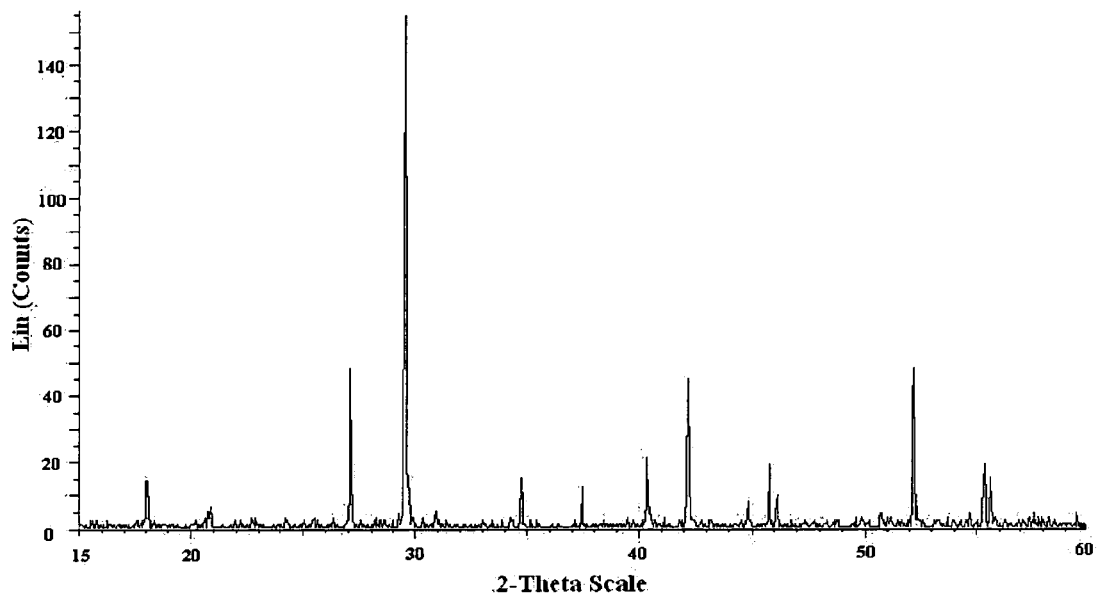
Figure 10:
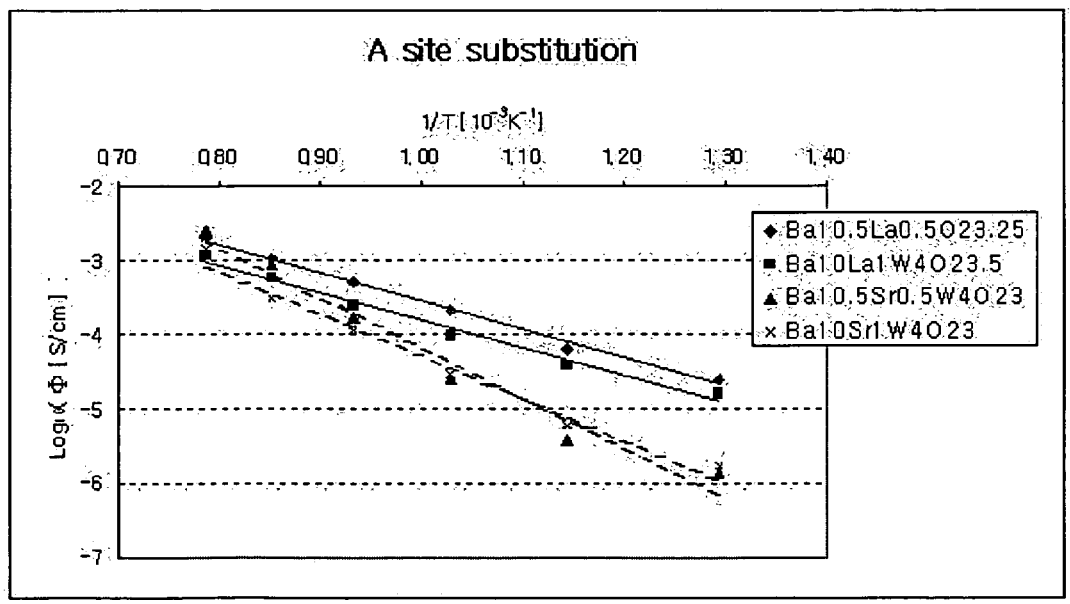
Figure 11:
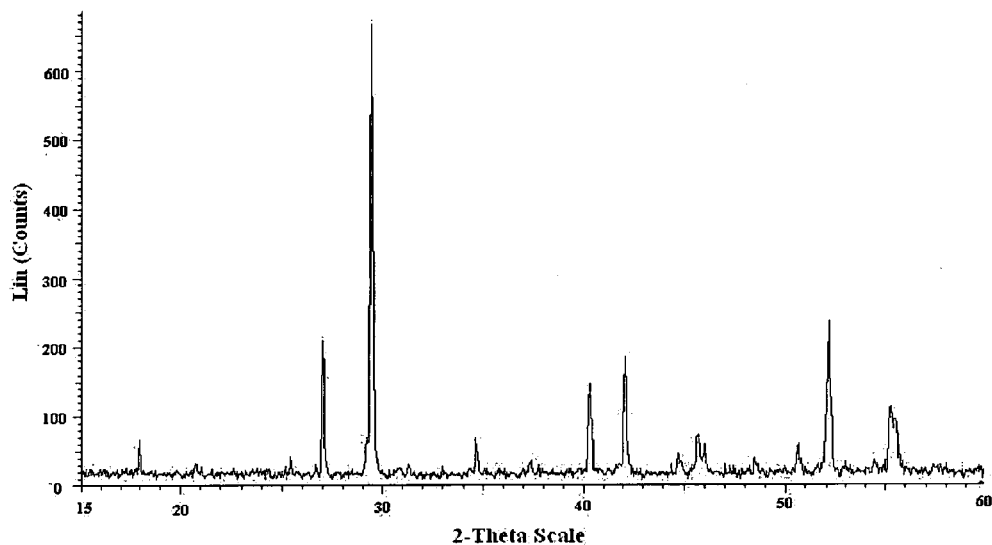
Figure 12:
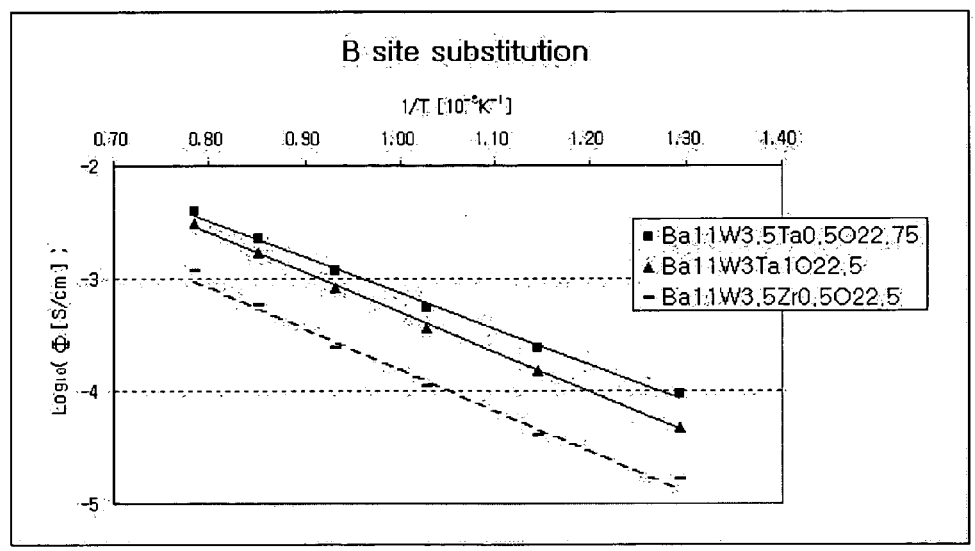
Figure 13:
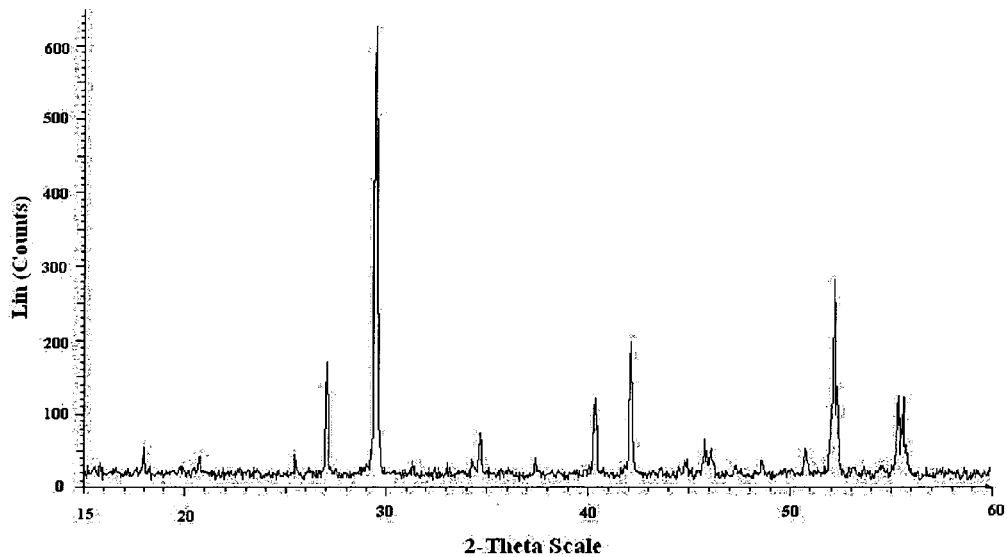
Figure 14:
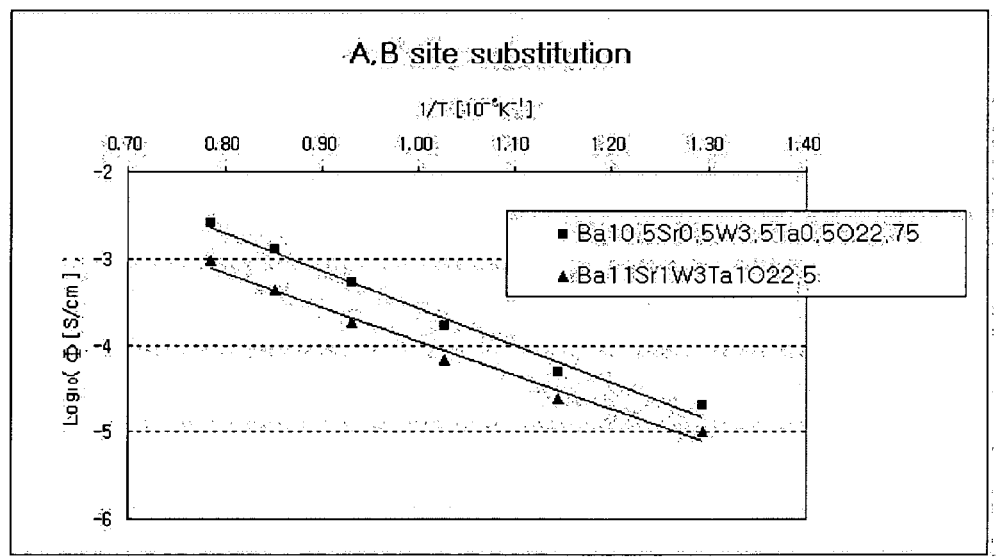

FIG. 5 is a view showing an atom density map (Fourier synthesis map) calculated by a neutron diffraction analysis;

FIG. 6 is a view showing a crystal structure of one layer on ab-cross section of a barium-tungsten oxide ($Ba_{11}W_4O_{23}$) prepared in Example 1;

FIG. 7 is a view showing a unit cell structure of a barium-tungsten oxide ($Ba_{11}W_4O_{23}$) prepared in Example 1;

FIG. 8 is a view showing oxygen ionic conductivity of a barium-tungsten oxide ($Ba_{11}W_4O_{23}$) of Example 1 at various temperatures;

FIG. 9 is a view showing an X-ray (Cu K$\alpha_1$, $\lambda$=1.5405 Å) diffraction pattern of a barium-strontium-tungsten composite oxide ($Ba_{10}Sr_1W_4O_{23}$) prepared in Example 3;

FIG. 10 is a view showing oxygen ionic conductivity of a metal composite oxide ($Ba_{11-x}A_xW_4O_{24-d}$) with A-site substituted according to the present invention;

FIG. 11 is a view showing an X-ray (Cu K$\alpha_1$, $\lambda$=1.5405 Å) diffraction pattern of a barium-tungsten-tantalum composite oxide ($Ba_{11}W_3Ta_1O_{22.5}$) prepared in Example 7;

FIG. 12 is a view showing oxygen ionic conductivity of a metal composite oxide ($Ba_{11}W_{4-y}B_yO_{24-d}$) with B-site substituted according to the present invention;

FIG. 13 is a view showing an X-ray (Cu K$\alpha_1$, $\lambda$=1.5405 Å) diffraction pattern of a barium-strontium-tungsten-tantalum composite oxide ($Ba_{10.5}Sr_{0.5}W_{3.5}Ta_{0.5}O_{22.75}$) prepared in Example 8; and FIG. 14 is a view showing oxygen ionic conductivity of a metal composite oxide ($Ba_{11-x}A_xW_{4-y}B_yO_{24-d}$) with A-site and B-site substituted according to the present invention

DISCLOSURE OF THE INVENTION

The inventors have discovered that a novel metal composite oxide prepared by mixing barium and tungsten at a specific ratio has a new crystal structure which has not been known to date and exhibits oxygen ion conductivity due to the new crystal structure. The inventors have synthesized multiple derivative compounds having the new crystal structure and analyzed ionic conductivity of each derivative compound. The analysis has revealed that oxygen ion conductivity is not an inherent property of a barium-tungsten oxide but results from the unique crystal structure with the ordered arrangement of metal sites and metal defects within a unit cell.

Therefore, it is an object of the present invention to provide metal composite oxides having a new crystal structure which exhibit ionic conductivities, ionic conductors including the metal composite oxides and electrochemical devices comprising the ionic conductors.

The present invention provides metal composite oxides with the new crystal structure, characterized by conditions (a) to (c):

(a) Space group is Fd-3m (no. 227);
(b) Unit cell parameter is 17.0±1.0 Å; and
(c) Crystallographic positions in the unit cell occupied by cations with site occupancies as specified in Table 2 (The crystallographic coordinates in the unit cell are based on space group No. 227, origin choice 2 (p.701 of "International tables for crystallography", vol. A, 5$^{th}$ ed. Kluwer Academic Publishers, 2002)).

TABLE 2

| Coordinates of cations (X, Y, Z) | Occupancy (O) |
| --- | --- |
| 8b (3/8, 3/8, 3/8) | $0 < O \leq 1$ |
| 48f(x, 1/8, 1/8), $0.37 \leq x \leq 0.43$ | $0 < O \leq 1$ |
| 32e(x, x, x), $0.20 \leq x \leq 0.26$ | $0 < O \leq 1$ |
| 16d(1/2, 1/2, 1/2) | $0 < O \leq 1$ |
| 16c(0, 0, 0) | $0 < O \leq 1$ |

The present invention also provides ionic conductors including the above metal composite oxides and electrochemical devices comprising the ionic conductors.

Hereinafter, the present invention will be explained in more detail.

The metal composite oxides according to the present invention are single-phase compounds having the previously unknown novel crystal structure. In other words, the present invention provides single-phase metal composite oxides having the novel crystal structure, preferably, a barium-tungsten composite oxide and/or derivatives thereof.

The metal composite oxides have a superstructure formed by the ordering of metal defects on a perovskite structure having a similar chemical formula, preferably, on a cryolite structure, and thereby produces the following effects.

1) Metal ions in the metal composite oxide according to the present invention have a new metal defect type which is distinguished from any known disordered or ordered defect type. According to the metal defect type of the present invention, metal ions occupy 8b, 48f, 32e, 16d, 16c sites as specified in Table 2, whereas metal defects exist at a specific site in the unit cell (i.e., 8a site (1/8, 1/8, 1/8)). Due to the ordering of a metal defect site (8a), an ion channel for easy movement of ions is automatically induced so that the metal composite oxide can function as an ionic conductor showing conductivity according to the movement of ions.

2) It is known that perovskite oxides generally have both oxygen ionic conductivity and hydrogen ionic conductivity in a moisture-containing atmosphere (T. Norby, Solid State Ionics, 125 (1999) 1-11; I. Animitsa, T. Norby, S. Marion, R. Glockner, A. Neiman, Solid State Ionics, 145, (2001) 357-364). In view of this fact, it is assumed that the metal composite oxides of the present invention, which show oxygen ionic conductivities through an ion channel induced therein, may also allow hydrogen ions (protons) to easily move through the ion channel and exhibit both oxygen ionic conductivity and hydrogen ionic conductivity.

3) It will be demonstrated that the novel crystal structure is not inherent only to a barium-tungsten oxide but results from the ordered arrangement of metal sites and metal defects within the unit cell. Demonstration of this fact will basically change the prediction and preparation of ionic conductive materials through simple changes in compositions and components generally performed in the art.

4) The present invention is the first recognition of the fact that the ordering of metal defects at 8a site, which renders the ionic conductivity to the metal composite oxide, is the most important factor of forming an ion channel. Through the analysis and determination of the defect ordering, new crystal structure materials having ionic conductivity could be developed. Those materials may provide a basis for the development of relevant technology.

In a metal composite oxide according to the present invention, cations (metal ions) occupy the crystallographic sites specified in Table 2. At the same time, some anions in the metal composite oxide, preferably, at least one anion, should have crystallographic coordinates "96g (x,x,z) ($0.40 \leq x \leq 0.60$, $0.59 \leq z \leq 0.66$)" and a site occupancy "$0<O \leq 1$". In addition, the site occupancy at 8a cation site (1/8, 1/8, 1/8) should more preferably be $0<O \leq 1$. Most preferably, 8a site (1/8, 1/8, 1/8) should be vacant. In other words, the site occupancy at 8a site (1/8, 1/8, 1/8) should be zero. With a smaller occupancy at 8a site, factors that may interrupt an ion conduction channel can be reduced, thereby resulting in higher ionic conductivity.

Preferably, the metal composite oxides according to the present invention should have the novel crystal structure at a temperature above 100° C., i.e., within a range of operating temperatures of an electrochemical device. The temperature, however, is not limited to the above range. The metal composite oxides can have the novel crystal structure at a room temperature or a higher temperature.

The metal composite oxides having the novel crystal structure can be represented by chemical formulae 1 to 4.

[Formula 1]

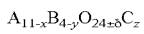

$$A_{11-x}B_{4-y}O_{24\pm\delta}C_z \quad (I)$$

[Formula 2]

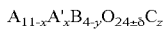

$$A_{11-x}A'_xB_{4-y}O_{24\pm\delta}C_z \quad (II)$$

[Formula 3]

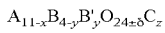

$$A_{11-x}B_{4-y}B'_yO_{24\pm\delta}C_z \quad (III)$$

[Formula 4]

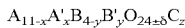

$$A_{11-x}A'_xB_{4-y}B'_yO_{24\pm\delta}C_z \quad (IV)$$

wherein,

A is at least one divalent element selected from the group consisting of an alkaline earth metal, Cd, Sn, Pb, Sm, Eu. Er, Tm and Yb;

A' is at least one element selected from the group consisting of a monovalent alkali metal; a trivalent rare earth element, Bi(III), Sb(III) or As(III); a tetravalent rare earth element of Ce(IV), Pr(IV) Tb(IV), Th(IV) or U(IV); and a cationic element of Zr(IV), Hf(IV) or IIIB through VIA groups;

B is at least one hexavalent element selected from the group consisting of VIA, VIIA, VIII and VIB, F excluding oxygen;

B' is at least one element selected from the group consisting of Li, Na, Mg, Ca, Sc, Y, rare earth elements (elements No. 63 to 71) and elements of IIIB to VA groups and having hexavalent or lower oxidation states;

C is at least one anion or $H^+$ cation selected from the group consisting of S, F and Cl; and X is a decimal between 0 and 11 ($0 \leq x \leq 11$), y is a decimal between 0 and 4 ($0 \leq y \leq 4$), z is a decimal between 0 and 8 ($0 \leq z \leq 8$), and $\delta$ is a decimal between 0 and 6 ($0 \leq \delta \leq 6$).

In formulae 1 to 4, A is preferably a combination of at least one element selected from the alkaline earth metal group consisting of Be, Mg, Ca, Sr, Ba and Ra, more preferably a combination of Ba and Sr or Ba and Ca having large-size ions.

In formulae 1 to 4, A' preferably includes at least one of a monovalent element or a trivalent element which is preferably at least one rare earth element selected from the group consisting of La, Ce, Pr, Nd, Sm, Eu and Gd. More preferably, the monovalent element is K and the trivalent element is at least one of La, Gd and Bi.

In formulae 1 to 4, B is preferably at least one element selected from the group consisting of W, Mo and Cr. B' is preferably at least one element selected from the group consisting of Nb, Ta, V and S with higher reducibility.

In formulae 1 to 4, C is preferably an $H^+$ cation (proton). $H^+$ (proton) present in the unit cell due to the moisture $H_2O$ included in a wet atmosphere can easily move through the ion channel explained above and function as an ionic conductor.

The metal composite oxide represented by formulae 1 to 4 includes, but is not limited to, $Ba_{11}W_4O_{23}$, $Ba_{10.5}Sr_{0.5}W_4O_{23}$, $Ba_{10}Sr_1W_4O_{23}$, $Ba_{10.5}La_{0.5}W_4O_{23.5}$, $Ba_{10}La_1W_4O_{23.5}$, $Ba_{11}W_{3.5}Ta_{0.5}O_{22.75}$, $Ba_{11}W_3Ta_1O_{22.5}$ or $Ba_{10.5}Sr_{0.5}W_{3.5}Ta_{0.5}O_{22.75}$. The metal composition oxides can be any compound having the novel crystal structure explained above.

The metal composite oxides having the novel crystal structure can be prepared by conventional methods generally known in the art. For example, the metal composite oxides can be prepared by mixing precursor compounds each containing one or more elements specified in formulae 1 to 4 at an appropriate molar ratio, calcining the resulting mixture at a temperature between 700° C. and 1,700° C. and then cooling the mixture.

Any salts containing one or more elements specified in formulae 1 to 4 can be used as the precursor compounds. There is no limitation in the molar ratio of the precursor compounds. The precursor compounds can be mixed together at an appropriate molar ratio determined according to the object preparation.

Preferably, the mixture of the precursor compounds is calcined at a temperature above 700° C., preferably between 700° C. and 1,700° C., for 5 to 72 hours.

For the calcination process, the following conventional methods can be used: a first method of forming the mixture in a pellet and calcining the pellet; and a second method of calcining the mixture itself. However, there is no limitation in using any calcination method.

The calcined mixture is cooled to a room temperature to obtain a single-phase metal composite oxide having the novel crystal structure according to the present invention (for example, a barium-tungsten oxide and derivatives thereof). The cooling process can be carried out at a room temperature. Alternatively, the calcined mixture can be rapidly cooled using liquid nitrogen or water at room temperature.

To define the crystallographic specificity of the metal composite oxide prepared by the process explained above, $ABO_3$-type perovskite structure (FIG. 1) which is similar to the crystal structure of the metal composite oxide has been analyzed.

Figure 1:
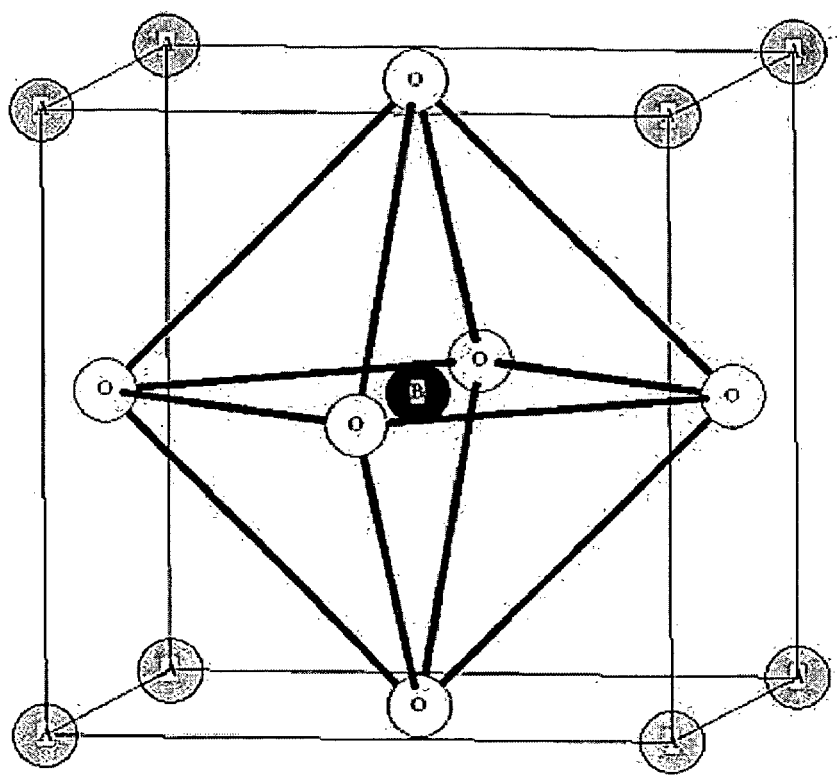
FIG. 1 illustrates a unit cell structure of $ABO_3$-type perovskite.

In the perovskite structure as shown in FIG. 1, a metal ion at B site is coordinated with oxygen atoms to form an octahedron. Also, A-site metal ions are coordinated with 12 oxygen atoms. When this $ABO_3$-type perovskite is multiplied by 8 and B site is substituted with two types B and B', resulting perovskite can be represented by formula $A_8(B_4B'_4)O_{24}$. When A and B are transcribed as barium and B' is transcribed as tungsten, the above formula will become $Ba_{12}W_4O_{24}$ that represents a generally known barium-tungsten oxide of a cryolite structure type.

A metal composite oxide prepared according to the present invention, for example, a barium-tungsten oxide $Ba_{11}W_4O_{23}$, was found to have barium and oxygen defects by 1/12 and 1/24 in the perovskite structure $Ba_{12}W_4O_{24}$. Also, in a crystallographic structure of $Ba_{11}W_4O_{23}$, ordering of the barium defect at the center of channel in the tungsten (W(2)) polyhedron and formation of an oxygen channel according to the barium defect were observed (see FIG. 7) simultaneously. This is a new crystal structure formed by the ordering of metal defects in the generally known cryolite structure (Fm3m, space group no. 225, unit cell parameter ~8.5 Å).

The inventors have recognized and demonstrated for the first time that the ordering of the metal defect site (8a) indicated by $V_u$ and $V_d$ in FIG. 6 is the most important factor of forming the oxygen channel.

The novel crystal structure of the metal composite oxide prepared according to the present invention is defined to have a space group Fd-3m (no. 227), a unit cell parameter of about 17.0±1.0 Å, metal sites (8b, 48f, 32e, 16d and 16c) occupied by metal ions and a specific site (8a (1/8, 1/8, 1/8)) with metal defects. The metal defect site automatically forms an ion channel for easy movement of ions as shown in FIG. 7, regardless of the metal ions forming the crystal structure. It is possible to predict the ionic conductivity of the metal composite oxide through such an ion conduction channel.

The inventors have also synthesized multiple derivatives with various metals substituted and performed experiments to confirm the ionic conductivities of the derivatives. They have demonstrated that the novel crystal structure explained above is not inherent only to a barium-tungsten oxide but results from the ordered arrangement of metal sites and metal defects within the unit cell.

The present invention provides ionic conductors including metal composite oxides with the novel crystal structure, preferably, oxygen- or proton-selective ionic conductors.

Ionic conductors are materials that conduct electricity with the movement of ions. Generally, ionic conductors are used in a membrane type having a separation factor that selectively permeates one element.

The ionic conductors according to the present invention can be prepared using a conventional method generally known in the art. For example, the ionic conductor can be prepared by coating a conductive electrode to apply an electric field. At this time, a metal composite oxide of the present invention can be used alone as an ionic conductor or mixed appropriately with any other materials known in the art according to purposes or applications.

In addition, the present invention provides electrochemical devices comprising metal composite oxides having the novel crystal structure as ionic conductors.

The electrochemical devices can be any device for performing electrochemical reactions, which includes, but is not limited to, an oxygen probe, a fuel cell, a chemical membrane reactor, an oxygen separation membrane, an oxygen pump, a hydrogen separation membrane, a hydrogen pump, a hydrogen gas sensor, a steam sensor, a hydrocarbon sensor, a hydrogen extraction, a hydrogen pressure controller, isotope enrichment, tritium technology, steam electrolysis, $H_2S$ electrolysis, HCl electrolysis, hydrogenation of hydrocarbon, dehydrogenation, $NH_3$ formation, an electrochemical cell, an electrochromic device, a gas sensor or a $NO_x$ trap.

The metal composite oxides included in the electrochemical devices according to the present invention, for example, a barium-tungsten oxide or a derivative thereof, plays a role as an oxygen or proton ionic conductor. Accordingly, the metal composite oxide can be used for electrochemical filtration through a porous filter, electrochemical treatment of a gas-state efflux or heterogeneous catalysis. The metal composite oxides can also be used in a chemical membrane reaction of a reactor for controlling oxidation of hydrocarbon or incorporated into an oxygen separation membrane. In addition, the metal composite oxides can be used as an electrolyte of a fuel cell that uses hydrogen as a fuel.

BEST MODE FOR CARRYING OUT THE INVENTION

Reference will now be made in detail to the preferred embodiments of the present invention. It is to be understood that the following examples are illustrative only and the present invention is not limited thereto.

EXAMPLES 1~8

Metal Composite Oxide

Example 1

Barium carbonate ($BaCO_3$) and a tungsten oxide ($WO_3$) were weighed and mixed at a metal-based molar ratio of 11:4. The resulting mixture was heated at a temperature of 1,1000° C. for 20 hours. The heated mixture was cooled to a room temperature and remixed to become a powder state or form a pellet. The powder or pellet was heated in air at 1,100° C. for 10 hours and then rapidly cooled using liquid nitrogen to complete the synthesis of a barium-tungsten oxide ($Ba_{11}W_4O_{23}$)

<Preparation of a Metal Composite Oxide with A-Site Substituted>

Example 2

A barium-strontium-tungsten composite oxide ($Ba_{10.5}Sr_{10.5}W_4O_{23}$) was prepared in a similar way to Example 1, except that strontium Carbonate ($SrCO_3$) was added to barium carbonate ($BaCO_3$) and tungsten oxide ($WO_3$) and mixed together at a metal-based molar ratio of 10.5:4:0.5 ($BaCO_3:WO_3:SrCO_3$)

Example 3

A barium-strontium-tungsten composite oxide ($Ba_{10}Sr_1W_4O_{23}$) was prepared in a similar way to Example 1, except that strontium Carbonate ($SrCO_3$) was added to barium carbonate ($BaCO_3$) and tungsten oxide ($WO_3$) and mixed together at a metal-based molar ratio of 10:4:1 ($BaCO_3:WO_3:SrCO_3$).

Example 4

$Ba_{10.5}La_{0.5}W_4O_{23.25}$ was prepared in a similar way to Example 1, except that lanthanum oxide ($La_2O_3$) was added to barium carbonate ($BaCO_3$) and tungsten oxide ($WO_3$) and mixed together at a metal-based molar ratio of 10.5:4:0.5 ($BaCO_3:WO_3:La_2O_3$)

Example 5

$Ba_{10}La_1W_4O_{23.5}$ was prepared in a similar way to Example 1, except that lanthanum oxide ($La_2O_3$) was added to barium carbonate ($BaCO_3$) and tungsten oxide ($WO_3$) and mixed together at a metal-based molar ratio of 10:4:1 ($BaCO_3:WO_3:La_2O_3$).

<Preparation of a Metal Composite Oxide with B-Site Substituted>

Example 6

$Ba_{11}W_{3.5}Ta0.5O_{22.75}$ was prepared in a similar way to Example 1, except that tantalum oxide ($Ta_2O_5$) was added to barium carbonate ($BaCO_3$) and tungsten oxide ($WO_3$) and mixed together at a metal-based molar ratio of 11:3.5:0.5 ($BaCO_3:WO_3:Ta_2O_5$)

Example 7

$Ba_{11}W_3Ta_1O_{22.5}$ was prepared in a similar way to Example 1, except that tantalum oxide ($Ta_2O_5$) was added to barium carbonate ($BaCO_3$) and tungsten oxide ($WO_3$) and mixed together at a metal-based molar ratio of 11:3:1 ($BaCO_3:WO_3:Ta_2O_5$).

<Preparation of a Metal Composite Oxide with A-Site and B-Site Substituted>

Example 8

$Ba_{10.5}Sr_{0.5}W_{3.5}Ta_{0.5}O_{22.75}$ was prepared in a similar way to Example 1, except that strontium carbonate ($SrCO_3$) and tantalum oxide ($Ta_2O_5$) were added to barium carbonate ($BaCO_3$) and tungsten oxide ($WO_3$) and mixed together at a metal-based molar ratio of 10.5:3.5:0.5:0.5 ($BaCO_3:WO_3:SrCO_3:Ta_2O_5$).

Experimental Example 1

Analysis of Chemical Compositions of Metal Composite Oxides (ICP-AES)

The chemical compositions of metal composite oxides according to the present invention were analyzed by ICP-AES (Inductively Coupled Plasma Atomic Emission Spectroscope).

As samples, barium/tungsten-containing composite oxides prepared in Examples 1 to 8 were used. Each sample was pulverized, poured into a glass vial, dissolved with a Conc. nitric acid and completely decomposed using hydrogen peroxide. Each sample was diluted to three different volumes and analyzed by a standard method using ICP-AES (GDC Integra XMP).

ICP elementary analysis was performed on the barium-tungsten oxide in Example 1. The results of analysis showed that the molar ratio of barium to tungsten is 11.00:4.00 (+0.02). The mole value of oxygen was calculated to be 23 based on the oxidation number of metal and the above molar ratio. Consequently, it was confirmed that the barium-tungsten oxide in Example 1 can be represented by $Ba_{11}W_4O_{23}$ which implies barium and oxygen defects by $1/12$ and $1/24$ in known $Ba_{12}W_4O_{24}$.

The metal composite oxides in Examples 2 to 8 were analyzed in the same manner. Chemical compositions of those metal composite oxides are specified in Table 3. The results of analysis revealed that the metal composite oxides in Example 2 to 8, like the metal composite oxide in Example 1, are novel materials which are different from conventional metal composite oxide.

Experimental Example 2

Analysis of the Crystal Structure of Metal Composite Oxides

The following analysis was performed to analyze the crystallographic structures of the metal composite oxides according to the present invention and demonstrate that those metal composite oxides are novel and distinguished from known barium-tungsten compounds.

2-1. Analysis of Crystal Structure using X-Ray Diffraction Pattern (XRDP) and Neutron Diffraction Pattern As samples subject to diffraction analysis, barium/tungsten-containing composite oxides as prepared in Examples 1 to 8 were used.

Each sample was pulverized and filled in a sample holder for X-ray powder diffraction. Each sample was scanned using Bruker D8-Advance XRD with $CuK\alpha_1$ ($\lambda=1.5405$ Å) radiation at an applied voltage of 40 kV and an applied current of 50 mA and with a step size of 0.02°. A neutron diffraction analysis was carried out using HANARO HRPD system (Korea Atomic Energy Research Institute). Neutrons were scanned using 2 He-3 multi-detector system and Ge(331) monochromator ($\lambda=1.8361$ Å) with a step size of 0.05°.

Figure 2:
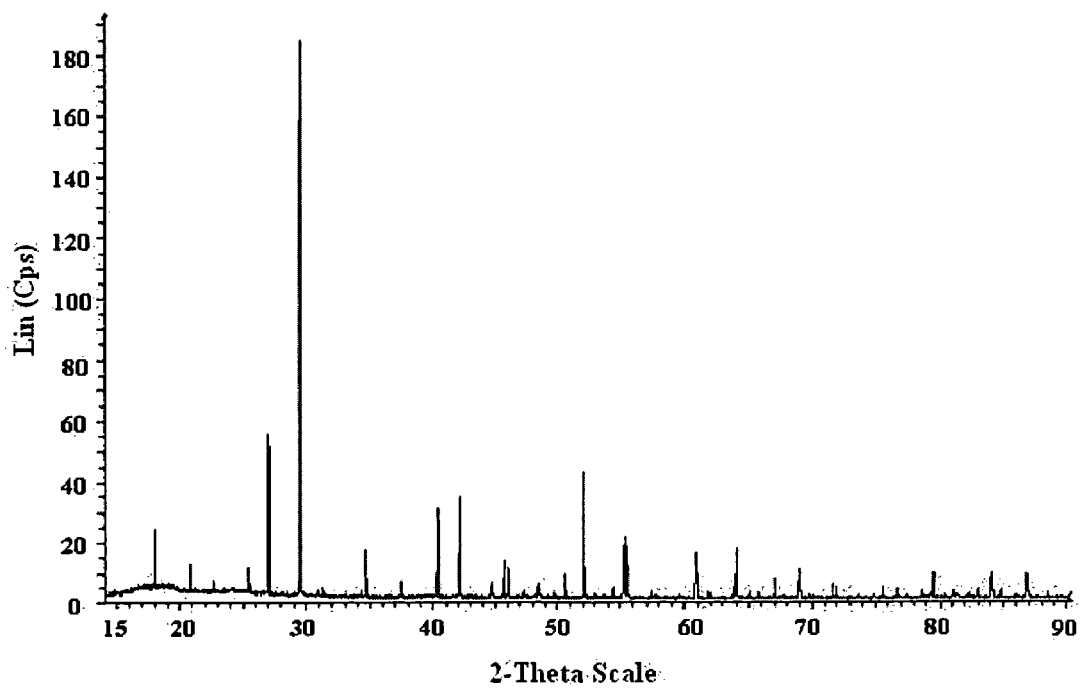
FIG. 2 is a view showing an X-ray (Cu $K\alpha_1$, $\lambda=1.5405$ Å) diffraction pattern ("XRDP") of a barium-tungsten oxide ($Ba_{11}W_4O_{23}$) prepared in Example 1.

In the X-ray diffraction pattern (XRDP) of the barium-tungsten oxide prepared in Example 1, diffraction peaks were observed and a unit cell parameter of 17.19±05 Å was obtained from the positions of the peaks. Indexing all peaks and observing the extinction rule in this diffraction pattern, a space group of FD-3m (no. 227) was determined (see FIG. 2). In addition, from this diffraction pattern with all peaks indexed, it was confirmed that the barium-tungsten oxide in Example 1 is a pure single-phase without impurity.

The barium-strontium-tungsten composite oxide in Example 3 (FIG. 9), barium-tungsten-tantalum composite oxide in Example 7 (FIG. 11) and barium-strontium-tungsten-tantalum composite oxide in Example 8 (FIG. 14) were analyzed in the same manner using X-ray diffraction patterns (XRDP). The diffraction patterns showed that the barium/tungsten-containing composite oxides in Examples 2 to 8 have unit cell parameters in the same range as the unit cell parameter of the barium-tungsten oxide in Example 1 and the same space group as the barium-tungsten oxide in Example 1. Thus, the metal composite oxides of the present invention were all turned out to be pure single phase.

Figure 3:
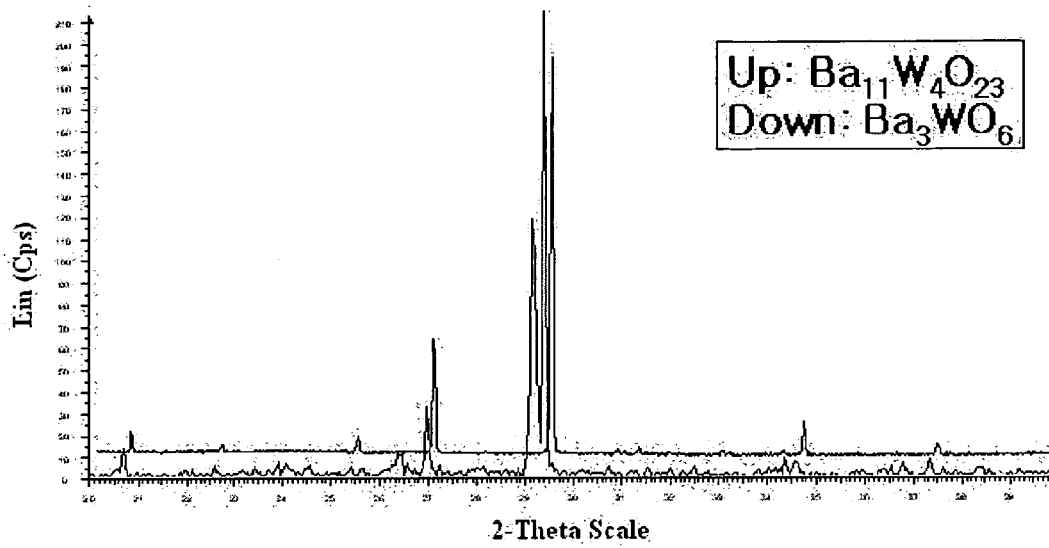
FIG. 3 is a view comparing XRDP of $Ba_3WO_6$ with XRDP of $Ba_{11}W_4O_{23}$.

The XRDP of $Ba_{11}W_4O_{23}$ prepared in Example 1 was compared with that of $Ba_3WO_6$ ($Ba_{12}W_4O_{24}$) known in the art. While one peak was observed in $Ba_{11}W_4O_{23}$ at a main highest peak angle between 29 and 30 degrees, two peaks were observed in $Ba_3WO_6$ at the same angle (see FIG. 3). This is a clear evidence that the two compounds $Ba_{11}W_4O_{23}$ and $Ba_3WO_6$ have different structures.

TABLE 3

| Example | Metal Composite Oxide | Unit Cell Parameter (Å) |
|---|---|---|
| Example 1 | $Ba_{11}W_4O_{23}$ | 17.188(5) |
| Example 2 | $Ba_{10.5}Sr_{0.5}W_4O_{23}$ | 17.179(5) |
| Example 3 | $Ba_{10}Sr_1W_4O_{23}$ | 17.177(5) |
| Example 4 | $Ba_{10.5}La_{0.5}W_4O_{23.25}$ | 17.151(5) |
| Example 5 | $Ba_{10}La_1W_4O_{23.5}$ | 17.178(5) |
| Example 6 | $Ba_{11}W_{3.5}Ta_{0.5}O_{22.75}$ | 17.180(5) |
| Example 7 | $Ba_{11}W_3Ta_1O_{22.5}$ | 17.195(5) |
| Example 8 | $Ba_{10.5}Sr_{0.5}W_{3.5}Ta_{0.5}O_{22.75}$ | 17.166(5) |

2-2. Setting and Analysis of a Structural Model

To determine the crystal structure of the metal composite oxides of the present invention, LeBail fitting was performed for all peaks in Experimental Example 2-1 using GSAS (A. C. Larson and R. B. Von Dreele, "General Structure Analysis System," Report no. LAUR086-748, Los Alamos National Laboratory, Los Alamos, N.Mex. 87545) program, thereby obtaining structure factors. Then, a crystal structure analysis was performed using a single crystal structure solution based on CRYSTALS (D. J. Watkin, C. K. Prout, J. R. Carruthers, P. W. Betteridge, CRYSTALS, Issue 10; Chemical Crystallography Laboratory, University of Oxford: Oxford, U.K. 1996). The crystallographic data of the structural model is as shown in Table 4.

TABLE 4

| Atom | Site | x | y | z | Occup. | $U_{iso}$[a] |
|---|---|---|---|---|---|---|
| Ba1 | 8b | 0.375 | 0.375 | 0.375 | 1 | 2.1(2) |
| Ba2 | 48f | 0.4002(1) | 0.125 | 0.125 | 1 | 3.3(1) |

TABLE 4-continued

| Atom | Site | x | y | z | Occup. | $U_{iso}$ [a] |
|---|---|---|---|---|---|---|
| Ba3 | 32e | 0.22556(8) | 0.22556(8) | 0.22556(8) | 1 | 5.1(1) |
| W1 | 16d | 0.5 | 0.5 | 0.5 | 1 | 1.3(1) |
| W2 | 16c | 0 | 0 | 0 | 1 | 2.2(1) |
| O1 | 96g | 0.49970(7) | 0.49970(7) | 0.61246(7) | 1 | 2.4(1) |
| O2 | 96g | 0.0779(2) | 0.0779(2) | −0.0064(3) | 0.412(1) [b] | 6.2(4) |
| O3 | 96h | 0.0762(2) | −0.0762(2) | 0 | 0.308(1) [b] | 9.0(9) |
| O4 | 96g | 0.1037(5) | −0.0063(4) | −0.0063(4) | 0.197(1) [b] | 9.7(8) |

[a] $U_{iso} = (U_{11} + U_{22} + U_{33})/3$.
[b] The partial occupancies of O2, O3 and O4 were refined with a constraint that would satisfy the charge neutrality condition of the compound.

2-3. Rietveld Simulation

The inventors performed X-ray and neutron Rietveld simulations using the XRDP of the barium/tungsten-containing oxides of the present invention and the crystallographic data of the structural model set in Experimental Example 2.

Figure 4:
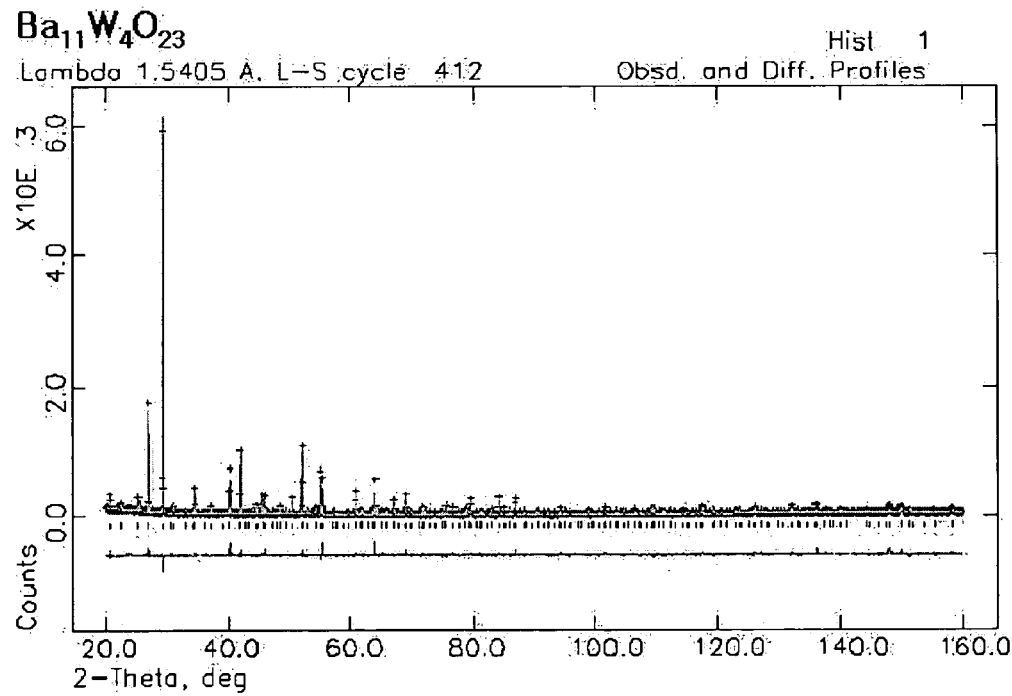
FIG. 4 is a Rietveld profile comparing XRDP of $Ba_{11}W_4O_{23}$ measured in Example 1 with a theoretical pattern of a structural model.

According to the Rietveld simulations, the reliability of the structural model was $R_w$=6% and a Rietveld profile was fitted over the whole range (see FIG. 4). The difference peaks observed below the Bragg position in the Rietveld profile of FIG. 4 indicate that the measured peaks conform to the simulation peaks of the structural model in all measurement sections. This evidences that the crystal structure determination in Table 4 using a structural model is correct and that the metal composite oxides of the present invention (i.e., a barium/tungsten-containing composite oxides) are all single phase.

FIG. 5 shows a Fourier synthesis map (atom density map) of (001) section obtained in a neutron diffraction analysis. In view of the distribution of O2, O3 and O4 in Table 4, it is determined that W(2) (16c site) forms a channel in <110>direction and that O2, O3 and O4 around W2 forms an oxygen channel at the same time. These oxygen atoms are all partially filled due to a low density. The site occupancies of these oxygen atoms (i.e., O2, O3 and O4) are much less than 1 as specified in Table 4.

FIG. 6 is a view showing one layer on ab-cross section of the barium-tungsten oxide ($Ba_{11}W_4O_{23}$) prepared in Example 1. In addition to W(1), W(2) and barium, oxygen atoms are depicted with small circles. W(1) octahedrons are spaced with a barium atom positioned between every two adjacent ones. However, in the arrangement of W(2) polyhedrons, a defect of barium atom which is indicated by $V_u$ or $V_d$ at 8a site (1/8, 1/8, 1/8) is observed between every two adjacent W(2) polyhedrons. Particularly, defects indicated by $V_u$ or $V_d$ at 8a site are ordered at intervals on a channel of W2 oxygen polyhedrons. If the 8a site is occupied by a metal, it would be difficult to form a channel of W2 oxygen polyhedrons because of the narrowness of space. In view of this, the ordering of metal defects appears to be the most important factor of forming an oxygen channel for easy movement of oxygen.

2-4. Measurement of Distance Between Oxygen Atoms in Crystal

To prove that the ordering of metal defects is important to form an oxygen channel, the distance between oxygen atoms in a unit cell was measured.

The measurement was done based on the data in Table 4 using a generally used crystallographic calculation program or a structure simulation program (for example, ATOMS for windows, Ver. 5, 1999, Shape Software, 521 Hidden Valley Road, Kingsport, Tenn. 37663 USA).

According to the results of measurement, the distance between the oxygen atoms O2, O3 and O4 in the barium-tungsten oxide in Example 1 is less than 2.2 Å. Generally, oxygen atoms cannot be spaced at such a shorter distance. The measured distance can be an evidence supporting the fact that the oxygen atoms present in the metal composite oxides of the present invention, for example, in a barium-tungsten oxide, are partially filled, which conforms to the data in Table 4.

2-5. Results of Analysis of Crystallographic Structure of Metal Composite Oxides As explained above, the metal composite oxides of the present invention (i.e., barium/tungsten-containing composite oxides) have a cubic structure with a unit cell parameter of 17.0±1.0 Å and a space group Fd-3m (no. 227), which is novel and distinguishing from previously known structures. It was also shown that the atomic positions in the unit cell of the metal composite oxides according to the present invention are agree with those specified in Table 4.

FIG. 7 is a view showing a structural model of the barium-tungsten oxide ($Ba_{11}W_4O_{23}$) prepared in Example 1. W(1) octahedrons, 18-coordinated W(2) polyhedrons and gray barium circles are illustrated. It can be observed that the W(2) polyhedrons form a channel.

In view of the results of analysis, it is concluded that the metal composite oxides of the present invention have a crystal structure with 8b, 48f and 32e sites occupied by barium, 16d site occupied by W(1), 8a site with metal defects ordered along the W(2) channel at 16c site and a channel of W(2) oxygen polyhedrons formed along the metal defects. It is predictable that the metal composite oxides of the present invention can easily conduct oxygen ions due to the oxygen channel formed along the metal defects.

Experimental Example 2

Evaluation of Oxygen Ion Conductivity

The following experiment was carried out to evaluate the ionic conductivity of the metal composite oxides prepared according to the present invention.

As samples, the barium/tungsten-containing composite oxides prepared in Examples 1 to 8 were used. The conductivity of each sample was measured at a frequency ranging from 0.1 Hz to 32 MHz using a complex impedance spectroscopy. After heat stabilization, each sample was measured in moisture-removed air at an electric potential of about 100 mV for about 1 hour.

It was turned out that all of the metal composite oxides having the novel crystal structure according to the present invention exhibit superior oxygen ion conductivity at various temperatures (see FIGS. 8, 10, 12 and 14). Therefore, the metal composite oxides of the present invention can be used as ionic conductors.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

The invention claimed is:

1. A metal composite oxide having the new crystal structure characterized by conditions (a) to (c):
    (a) a space group of Fd-3m (no. 227);
    (b) a unit cell parameter of 17.0±1.0 Å; and
    (c) crystallographic positions in a unit cell occupied by cations 8b, 48f, 32e, 16d and 16c with site occupancies of greater than 0 and less than or equal to 1, wherein the coordinates of cations (X, Y, Z) are as follows:
    8b (3/8, 3/8, 3/8),
    48f (x, 1/8, 1/8), wherein $0.37 \leq x \leq 0.43$,
    32e (x, x, x), $0.20 \leq x \leq 0.26$,
    16d (1/2, 1/2, 1/2), and
    16c (0,0,0).

2. The metal composite oxide according to claim 1, characterized in that said new crystal structure satisfies the conditions (a) to (c) at temperatures above 100° C.

3. The metal composite oxide according to claim 1, characterized in that a crystallographic position in a unit cell is occupied by at least one anion 96g (x, x, z) with a site occupancy of greater than 0 and less than or equal to 1, wherein the coordinates of the anion are:
    $0.40 \leq x \leq 0.60$, and
    $0.59 \leq z \leq 0.66$.

4. The metal composite oxide according to claim 1, characterized in that a cation occupancy at 8a site (1/8, 1/8, 1/8) in the unit cell is from 0 to 1.

5. The metal composite oxide according to claim 4, characterize in that said cation occupancy at 8a site (1/8, 1/8, 1/8) in the unit cell is 0.

6. The metal composite oxide according to claim 1, characterized in that the oxide is represented by formula (I), (II), (III) or (IV):

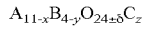
$$A_{11-x}B_{4-y}O_{24 \pm \delta}C_z \qquad (I)$$

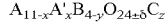
$$A_{11-x}A'_xB_{4-y}O_{24 \pm \delta}C_z \qquad (II)$$

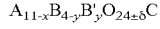
$$A_{11-x}B_{4-y}B'_yO_{24 \pm \delta}C \qquad (III)$$

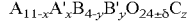
$$A_{11-x}A'_xB_{4-y}B'_yO_{24 \pm \delta}C_z \qquad (IV)$$

wherein,
A is at least one divalent element selected from the group consisting of an alkaline earth metal, Cd, Sn, Pb, Sm, Eu. Er, Tm and Yb;
A' is at least one element selected from the group consisting of Sr; a monovalent alkali metal; a trivalent rare earth element; Bi(III), Sb(III) or As(III); a tetravalent rare earth element of Ce(IV), Pr(IV) Tb(IV), Th(IV) or U(IV); and a cationic element of Zr(IV), Hf(IV) or IIIB through VIA groups;
B is at least one hexavalent element selected from the group consisting of VIA, VIIA, VIII and VIB, excluding oxygen;
B' is at least one element selected from the group consisting of Li, Na, Mg, Ca, Sc, Y, rare earth elements (elements No. 63 to 71) and elements of IIIB to VA groups and having hexavalent or lower oxidation states;
C is at least an H$^\pm$ cation or one anion selected from the group consisting of S, F and Cl; and
X is a decimal between 0 and 11 ($0 \leq x \leq 11$), y is a decimal between 0 and 4 ($0 \leq y \leq 4$), z is a decimal between 0 and 8 ($0 \leq z \leq 8$), and δ is a decimal between 0 and 6 ($0 \leq \delta \leq 6$).

7. The metal composite oxide according to claim 6, characterized in that A in formulae (I) to (IV) comprises at least one element selected from the alkaline earth metal group.

8. The metal composite oxide according to claim 7, characterized in that A in formulae (I) to (IV) is a combination of Ba and Sr or Ba and Ca.

9. The metal composite oxide according to claim 6, characterized in that A' in formulae (II) to (IV) includes at least one of a monovalent element or a trivalent element.

10. The metal composite oxide according to claim 9, characterized in that said trivalent element is at least one rare earth element selected from the group consisting of La, Ce, Pr, Nd, Sm, Eu and Gd.

11. The metal composite oxide according to claim 9, characterized in that said monovalent element is K and said trivalent element is at least one of La, Gd and Bi.

12. The metal composite oxide according to claim 6, characterized in that B in formulae (I) to (IV) is at least one element selected from the group consisting of W, Mo and Cr.

13. The metal composite oxide according to claim 6, characterized in that B' in formulae (III) to (IV) is at least one element selected from the group consisting of Nb, Ta, V and S.

14. The metal composite oxide according to claim 6, characterized in that C in formulae (I) to IV is an H$^+$ cation (proton).

15. The metal composite oxide according to claim 6, characterized in that the oxide is $Ba_{11}W_4O_{23}$, $Ba_{10.5}Sr_{0.5}W_4O_{23}$, $Ba_{10}Sr_1W_4O_{23}$, $Ba_{10.5}La_{0.5}W_4O_{23.25}$, $Ba_{10}La_1W_4O_{23.5}$, $Ba_{11}W_{3.5}Ta_{0.5}O_{22.75}$, $Ba_{11}W_3Ta_1O_{22.5}$ or $Ba_{10.5}Sr_{0.5}W_{3.5}Ta_{0.5}O_{22.75}$.

16. An Ionic conductor including metal composite oxide according to claim 1.

17. The Ionic conductor according to claim 16, characterized in that said conductor is oxygen- or proton(H$^+$)-selective.

18. An Electrochemical device comprising the metal composite oxide according to claim 1 as an ionic conductor.

19. The electrochemical device according to claim 18, characterized in that said devices are an oxygen probe, a fuel cell, a chemical membrane reactor, an oxygen separation membrane, an oxygen pump, a hydrogen separation membrane, a hydrogen pump, a hydrogen gas sensor, a steam sensor, a hydrocarbon sensor, a hydrogen extraction, a hydrogen pressure controller, isotope enrichment, tritium technology, steam electrolysis, H$_2$S electrolysis, HCl electrolysis, hydrogenation of hydrocarbon, dehydrogenation, NH$_3$ formation, an electrochemical cell, an electrochromic device, a gas sensor and a NO$_x$ trap.

20. An ionic conductor comprising the metal composite oxide of claim 1, the ionic conductor forming an ion channel by the ordering of metal defects in a unit cell.

* * * * *